United States Patent [19]
Doenges et al.

[11] Patent Number: 5,840,882
[45] Date of Patent: Nov. 24, 1998

[54] PROCESS FOR PREPARING CELLULOSE ETHERS WITH RECOVERY OF ALKALI

[75] Inventors: Reinhard Doenges, Bad Soden; Rudolf Ehrler, Floersheim, both of Germany

[73] Assignee: Clariant GmbH, Frankfurt, Germany

[21] Appl. No.: 911,946

[22] Filed: Aug. 20, 1997

[30] Foreign Application Priority Data

Aug. 22, 1996 [DE] Germany ................... 196 33 826.3

[51] Int. Cl.$^6$ ............................ C07H 1/00; C07H 15/08
[52] U.S. Cl. ................ 536/91; 536/85; 536/124
[58] Field of Search ................ 536/85, 91, 124

[56] References Cited

U.S. PATENT DOCUMENTS 4,508,895  4/1985  Balser ........................... 536/91

Primary Examiner—Gary L. Kunz

[57] ABSTRACT

Cellulose ethers which contain hydroxyalkyl groups are prepared, with the recovery of sodium hydroxide, by cellulose being etherified with alkylene oxide in a water-containing organic suspension medium in the presence of at least 1.0 mol of sodium hydroxide per mole of anhydroglucose units, the water-containing organic suspension medium being separated off after the etherification reaction is complete, the crude cellulose ether being extracted with a suitable solvent mixture, the lower-boiling organic components being distilled off from the solvent mixture after the extraction, the water-containing organic suspension medium separated off being added to the distillation residue of the solvent mixture to form a multiphase mixture, the bottom phase of the multiphase mixture being separated and the sodium hydroxide present in the bottom phase being reused.

15 Claims, 1 Drawing Sheet

PROCESS FOR PREPARING CELLULOSE ETHERS WITH RECOVERY OF ALKALI

FIELD OF THE INVENTION

This invention relates to a process for the preparation of cellulose ethers. An aspect of this invention relates to the preparation of hydroxyalkylcelluloses and to the work-up of the product and the byproducts of the process. A further aspect of this invention relates to the preparation of hydroxyalkylcelluloses by means of a reaction between cellulose and an alkylene oxide in the presence of an alkali, wherein the alkali serves as a catalyst and/or a partial hydrolysis agent for the reaction.

DESCRIPTION OF THE PRIOR ART

Water-soluble derivatives of cellulose when dissolved in aqueous systems produce an increase in viscosity. Favorable toxicological properties and the origin of the cellulose from the pool of renewable resources have made this class of substances into an ecologically and economically important consistency regulator, for example in the petroleum, construction, dyestuffs, cosmetics and food industries.

To prepare water-soluble hydroxyalkylcelluloses, cellulose is normally suspended in aqueous solvent, alkalinized with alkali, preferably sodium hydroxide solution, and reacted with the corresponding alkylene oxide. After the reaction is complete, the sodium hydroxide solution is neutralized with a mineral acid or acetic acid. The resulting salt is removed, together with the hydrolysis products of the alkylene oxide, glycols and polyglycols, from the crude product by being washed out repeatedly with a suitable aqueous solvent. The glycols, together with the salts, are normally passed to a wastewater treatment plant.

In principle, only a small amount of alkali is required for the etherification of celluloses with alkylene oxides, since etherifications of alkylene oxide, in contrast to the Williamson ether synthesis take place without alkali being consumed, i.e. the alkali acts only as a catalyst. The depolymerization (partial hydrolytic breakdown) of the cellulose, however, does require from about 1.0 to about 1.4 mol of alkali per mole of anhydroglucose units for uniform etherification. After the neutralization this alkali inevitably produces an undesirable salt load which has to be removed.

Regarding the neutralization, the use of mineral acids has a number of drawbacks. The salts are not readily washed out with water-containing solvents. If the water concentration in the washing media is increased, this does improve the efficacy of the washing-out process, but the hydroxyalkylcellulose is likewise solubilized to the same extent and washed out at the same time. Good utility was shown by the combination, proposed in DE-C 12 12 058, of nitric acid during neutralization and water-containing acetone when the cellulose ether is washed out, since the sodium nitrate is sufficiently soluble in this medium, whereas hydroxyalkylcelluloses are virtually insoluble therein up to high degrees of substitution. In general, however, it is necessary with this method to dispose of from about 1.0 to 1.4 mol of sodium nitrate per mole of anhydroglucose units.

The use of acetic acid or other organic acids does have the advantage of washing-out proceeding more readily, but increases the organic carbon load of the wastewater, expressed as COD (chemical oxygen demand) and therefore puts an additional load on the wastewater treatment plant.

DE-A 16 68 347 therefore proposes that the sodium hydroxide solution, prior to neutralization, be largely removed from the cellulose ether by means of aqueous methanol or methanol-containing solvents, and that these only then be neutralized with mineral acids. After the solvents have been distilled off, the salts can be disposed of without an increase in the COD. The neutralization of residual alkali in the cellulose ether, in contrast, can be effected with any acid. The residual salt can remain in the cellulose ether, since minor amounts of salt in the product are tolerated.

In DE-A 11 77 127 the washing-out problem is solved by alkalinization being followed by partial etherification to a low molar degree of substitution (MS) of from 0.05 to 0.8 hydroxyalkyl units. From this hydroxyalkylcellulose which, owing to its low degree of substitution is water-insoluble, the sodium hydroxide solution can either be washed out directly or, after neutralization, the corresponding salt can be washed out easily. In the second etherification stage, hydroxyalkylation continues up to the degree of substitution (MS) aimed for, in the presence of residual sodium hydroxide remaining in the cellulose ether, a small amount of alkali having been added if required. After the neutralization the residual salt remains in the cellulose ether.

DE-A 32 16 786 discloses that, after the digestion of the cellulose with >1.2 mol of alkali per mole of anhydroglucose units, the alkali cellulose is washed out with a solvent mixture to from 0.3 to 0.8 mol of alkali per mole of anhydroglucose units and is then etherified with an alkylene oxide. The advantages of this process are that, owing to the lower alkali concentration, side reactions are inhibited, less neutralizing agent is required and less salt has to be washed out.

All of the above-described references discuss the work-up of crude hydroxyalkylcellulose, particularly the removal of sodium hydroxide from the crude product. DE-A 32 16 786 also mentions that the sodium hydroxide solution can be reused. How it can be treated to remove glycols and other by-products is not disclosed, however. Any contamination of the sodium hydroxide solution with glycol would, however, seriously interfere with renewed use in a hydroxyalkylation, since glycols consume alkylene oxide to form polyglycols. This leads to reduced yields and an increase in wastewater pollution.

It is therefore an objective of the present invention to provide a simple and economic process for preparing cellulose ethers which contain hydroxyalkyl groups, with recovery of alkali (preferably sodium hydroxide solution) from the process in a quality which enables reuse (preferably reuse in the hydroxyalkylation process itself), e.g. in sufficient purity for use as a cellulose etherification catalyst and/or a cellulose depolymerization (partial hydrolysis) agent for providing a more uniform cellulose starting material.

SUMMARY OF THE INVENTION

The aforementioned objective has been addressed by carrying out the hydroxyalkylation of the cellulose in a water-containing organic suspension medium, the reaction batch being separated, after the reaction is complete, from the suspension medium without neutralization, the crude cellulose ether being washed out with a solvent mixture until the desired amount of residual alkali is reached, the solvent mixture being distilled and the distillation residue of the solvent mixture being combined with the previously separated suspension medium, this resulting in a phase separation with a bottom phase of almost pure, concentrated alkali (preferably sodium hydroxide) solution which again is suitable for use in the hydroxyalkylation of cellulose.

The present invention therefore relates to a process for preparing water-soluble cellulose ethers which contain hydroxyalkyl groups, wherein cellulose is etherified with alkylene oxide in a water-containing organic suspension medium in the presence of at least 1.0 equivalent of alkali (preferably 1.0 mol of sodium hydroxide) per mole of anhydroglucose units, the water-containing organic suspension medium is separated off after the etherification reaction is complete, the crude cellulose ether is extracted with a suitable solvent mixture, the lower-boiling organic components are separated (e.g. distilled off) from the solvent mixture after the extraction, the water-containing organic suspension medium separated off is added to the distillation residue of the solvent mixture to form a multiphase mixture, the bottom phase of the multiphase mixture is separated and the sodium hydroxide present in the bottom phase is reusable and is partially reused, and the distillate of the solvent mixture is optionally reused.

BRIEF DESCRIPTION OF THE DRAWING

The sole FIGURE of the Drawing is a flow sheet illustrating a preferred embodiment of the process of this invention.

DETAILED DESCRIPTION

Figure 1:
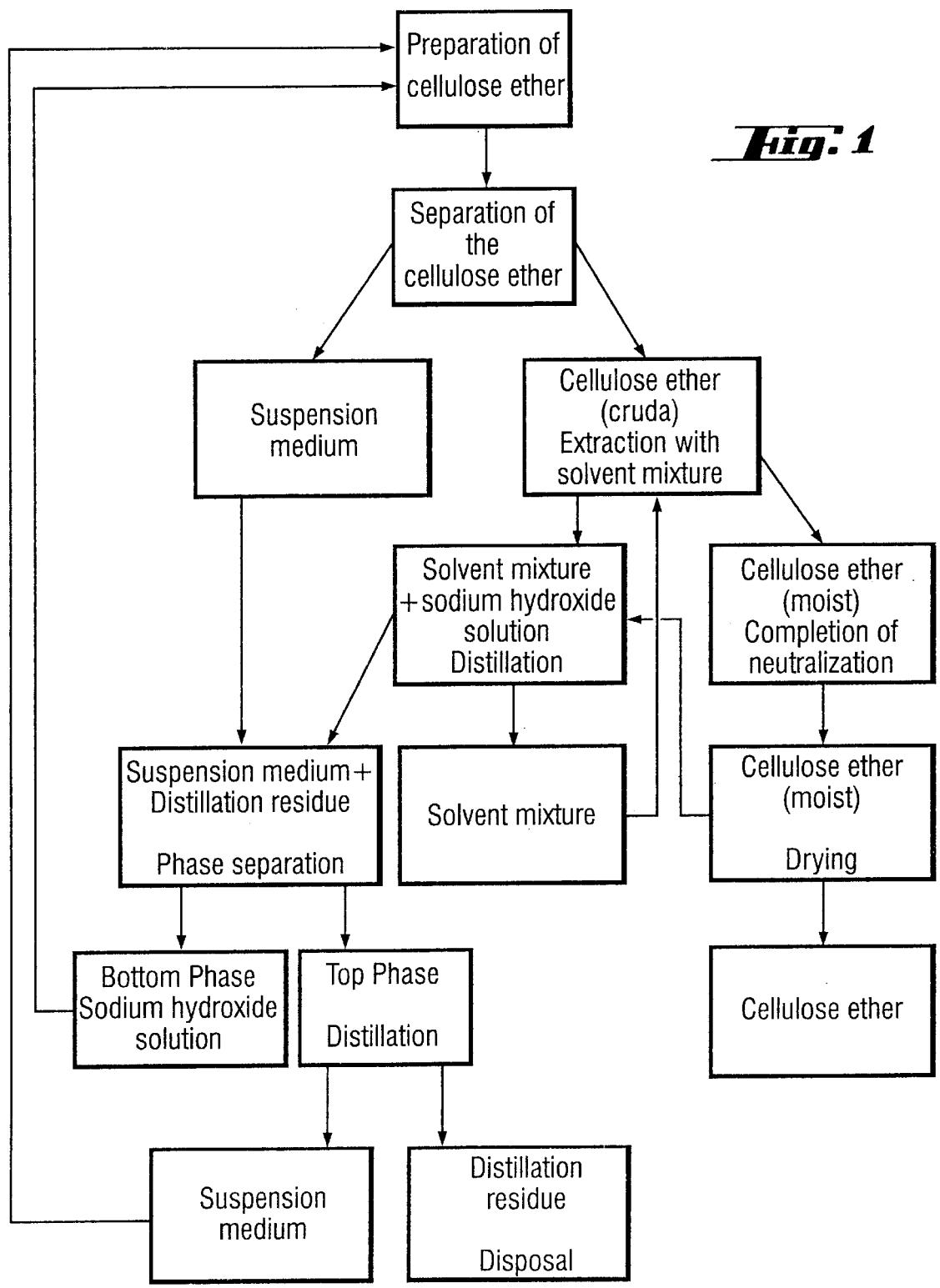

The process according to the invention can be used with all processes for preparing cellulose ethers, in which at least part of the alkali used is not consumed but has only a catalytic function. No alkali is consumed, for example, in the preparation of hydroxyethylcellulose from ethylene oxide and cellulose, hydroxypropylcellulose from propylene oxide and cellulose or in the preparation of mixed ethers from the said cellulose ether types. Hereinafter these ethers will summarily be referred to as hydroxyalkylcelluloses.

Hydroxyalkylcellulose is prepared in accordance with the so-called suspension method. To this end the cellulose is first partially depolymerized (hydrolytically attacked) with the aid of a strong alkaline agent. Cellulose is very resistant to hydrolysis, but inorganic alkaline agents, preferably the alkali metal hydroxides such as sodium hydroxide are strong enough to attack the linkages between anhydroglucose units, provided that roughly one equivalent or more of alkali for each mole of anhydroglucose units is present. The use of from 1.0 to 1.5 mol of sodium hydroxide solution per mole of anhydroglucose units is preferred. By providing sufficient alkali to attack a portion of the linkages between anhydrogluclose units, a person skilled in this art is able to utilize various delignified pulps and other inexpensive but non-uniform sources of cellulose. The cellulose thus adjusted in uniformity is reacted with, preferably, from about 2.0 to about 6.0 mol of alkylene oxide per mole of anhydroglucose units at temperatures moderately elevated above normal ambient temperature, preferably from about 40° to about 120° C. During the entire reaction the cellulose ether is in the form of a solid suspended in an organic liquid suspension medium which generally contains some water, typically a minor amount of water. Preferred suspension media are monohydric alcohols having from 2 to 4 carbon atoms and their mixtures with ketones having from 3 to 5 carbon atoms or with methanol. Particularly suitable are isopropanol and t-butanol and mixtures thereof. The water content of the suspension can be described in various ways, e.g. with respect to the weight of cellulose used or as a percentage of the total amount of liquid employed as the suspension medium. Preferred amounts of water can range from 0.5 to 3.0 parts by weight per part by weight of cellulose starting material used or from 1 to about 25% by weight (e.g. 5 to 20% by weight) of the total amount of liquid in the suspension medium.

In the description which follows, the work-up of the cellulose ether and the recovery of alkali according to the invention are explained. In the preferred work-up procedure, most of the alkali (e.g. sodium hydroxide) solution is recovered as is, in its alkaline or non-neutralized form. The neutralization, of essentially all excess sodium hydroxide, conventionally employed according to the prior art immediately after esterification of the cellulose has taken place, using a mineral acid and/or organic acid is avoided in the process of this invention; accordingly, neutralization is essentially confined to acid treatment of a residual amount of alkali contaminating the crude hydroxyalkylcellulose. The resulting amount of salt formation is very small in comparison to the amount of alkali introduced initially (for the etherification step) and hence does not create a significant salt load problem.

Turning now to the Drawing, it can be seen that in a preferred embodiment of the process the only product is the fully worked-up cellulose ether, and the only byproduct is a manageable amount of distillation residue which can be disposed of by environmentally friendly conventional techniques (or by further work-up and recovery, if desired). Thus, all other byproducts can be recycled back into the process; for example, the recovered solvent mixture (extraction medium) can be recycled back to the extraction step, the recovered suspension medium can be recycled back to the preparation of the cellulose ether, and the recovered sodium hydroxide solution is also recycled back to the cellulose ether preparation step. Less preferably, the recovered byproducts can be stored or used in a different process, but the quality or purity of the products preferably meets standards for recycling back into the cellulose ether preparation process itself.

Because the suspension medium in which the cellulose ether is formed and the extraction medium used to remove alkali from the cellulose ether product both preferably contain at least one monohydric alcohol, these media are at least partially compatible with inorganic alkalis such as the alkali metal hydroxides (e.g. NaOH) and can accept or remove relatively large amounts of sodium hydroxide, thereby facilitating sodium hydroxide recovery and re-use.

As shown in the Drawing, four key separation (or recovery) steps provide the route which avoids the need for any significant amount of neutralization in the process of this invention: (i) separation of the crude cellulose ether product from the suspension medium in which it was prepared, (ii) extraction (leaching) of the alkali from the crude cellulose ether with an organic extraction medium ("solvent mixture") to form an eluate, (iii) separation—preferably by distillation—of the eluate into alkali (preferably in solution form, byproducts of the etherification can also be present) and extraction medium (the extraction medium is compatible with the separated suspension medium and is added to that medium), and (iv) recovery of alkali (preferably sodium hydroxide solution) from the combined suspension medium and "solvent mixture"; sodium hydroxide solution forms the bottom or lower phase of the plurality of phases resulting when the suspension medium and "solvent mixture" are combined. (In a preferred additional separation step, the top or higher phase is distilled to recover suspension medium for re-use in the process, and the distillation residue from this higher phase is disposed of or subject to further recovery steps.)

Turning first to the separation of crude cellulose ether product from suspension medium, this step is essentially a liquid/solid separation. That is, the alkali-containing cellulose ether suspension is preferably split, preferably under an inert gas atmosphere, into a solids fraction containing cellulose ether and alkali and a liquid fraction containing mostly the liquid medium in which the etherification reaction took place. Units suitable for this liquid/solid separation include filtering devices, centrifuges, or the like. Thus, the liquid fraction mainly comprises the liquid suspension medium itself (one or more organic liquids having at least partial alkali metal hydroxide compatibility and some water) and, as by-products from the etherification reaction, glycols will normally be present. Some alkali solution can be present also, but most of it is confined to the solids fraction.

From the separated solids fraction the byproducts are extracted, the byproducts comprising glycols, hemicelluloses and sodium hydroxide solution. The extraction medium can comprise organic solvent at least partially compatible with alkali metal hydroxides and is preferably a solvent mixture. It is also preferred that the extraction medium be similar in composition (optionally, it can be identical) to the suspension medium in which the etherification took place. Examples of suitable solvents for the extraction have therefore been described previously and include, for example, alcohols having from 2 to 4 carbon atoms (e.g. ethanol, isopropylalcohol, etc.), lower ketones such as acetone, methanol, or especially mixtures containing methanol and/or ethanol, in particular in admixture with water.

If methanol-containing extraction media are used, the proportion by weight of methanol in the solvent mixture should preferably be at least 20 wt %. If the concentrations are lower, sodium hydroxide is no longer leached from the solid to an adequate extent. The proportion of methanol should preferably not exceed 80 wt %. Higher concentrations cause unwanted solubilization of the cellulose ether. The presence of water in the extraction medium is optional and preferably ranges in amount from 0 to about 10 wt %. Higher concentrations can cause the cellulose ether to swell. In one particularly preferred embodiment of the extraction medium, the methanol concentration ranges from about 20 to about 50 wt %, and the water concentration ranges from about 2 to about 7 wt %. The balance of the extraction medium can expediently be provided from organic liquid solvents employed in the suspension medium for the etherification reaction.

If ethanol-containing extraction media are used, the proportion by weight of ethanol in the solvent mixture (i.e. the extraction medium) should preferably be at least 30 wt %. If the concentrations are lower, sodium hydroxide is no longer leached from the solid to an adequate extent. The proportion of ethanol should preferably not exceed 90 wt %. As in extraction media embodiments discussed previously, the proportion of water preferably ranges from 0 to about 10 wt %. Ethanol concentrations of from about 40 to about 80 wt % and water concentrations of from about 2 to about 7 wt % are particularly preferred. The balance of the extraction medium expediently comprises organic liquid components employed in the suspension medium for the etherification reaction.

The extraction can be effected by repeated slurrying of the crude cellulose ether in the extraction medium, a weight ratio of solid to extraction medium of from 1:5 to 1:20 preferably being maintained. Optionally, extraction can also take place in a fixed bed by elution with the extraction medium. The progress of the extraction can be determined by conductivity measurements. The amount of extraction medium required is preferably from 12 to 25 parts by weight of solvent per part by weight of pure cellulose ether.

After the extraction the cellulose ether is reslurried in the extraction medium, and the alkali remaining therein is neutralized in a conventional manner with a mineral acid or acetic acid. Examples of suitable mineral acids are hydrochloric acid, nitric acid, sulfuric acid, phosphoric acid or carbon dioxide. After renewed filtration with suction or centrifuging, the moist material undergoes the customary drying process. The cellulose ether obtained according to this process generally contains less than 12 wt % of sodium salts, when sodium hydroxide is the alkali used in the process.

The eluate preferred solvent-mixture extraction medium (e.g. methanol and/or ethanol), can further contain dissolved alkali metal hydroxide, e.g. dissolved sodium hydroxide. The extraction medium can be worked up in such a way that the sodium hydroxide solution contained therein can be reused in the next batch. The more volatile organic solvent fractions are removed by simple distillation, for example by means of a rotary evaporator. After analysis and appropriate fortification, the condensate can again be used as a solvent mixture for the extraction. In addition to the sodium hydroxide solution, the aqueous distillation residue can contain glycols and hemicellulose derivatives as by-products from the preparation of the cellulose ether. The distillation residue is combined with the suspension medium phase, and a temperature of about 20°–70° C., preferably about 40°–60° C. is set. This results in phase separation, the bottom or lower phase phase comprising virtually pure aqueous sodium hydroxide in a concentration of from 15 to 30 wt %. This aqueous alkaline solution can be reused without further work-up and without additional agents, although fortification with additional alkali metal hydroxide is optional. Thus, more than 40% (by weight or in mol-%), preferably at least about 50% (same basis) of the alkali metal hydroxide solution is recovered. Amounts up to about 80% (by weight or in mol-%) of the alkali metal hydroxide solution used can be recovered in its alkaline state and recycled into the process preferably as the catalyst and/or partial hydrolysis agent for the etherification.

Any interphases present are separated together with the upper, organic phase which contains the glycols. The organic phase is distilled. The condensate can again be used as a suspension medium. The distillation residue mainly comprises glycols and small amounts of hemicelluloses. These can be passed to a wastewater treatment plant in the usual way or be disposed of in some other manner, for example by incineration. Alternatively, substances can be recovered from the distillation residue (e.g. if disposal is not desired); for example, ethylene glycol and alkyl monoglycols can be obtained by distillation from the distillation residue.

EXAMPLES

The products obtained from the novel process were characterized as follows:

The viscosity of a 2 wt % aqueous solution was determined in a Höppler viscometer. The water-insoluble fraction of the cellulose ether was determined by repeated dissolving and decanting, followed by drying of the residue. The molar degree of substitution (MS) was determined by decomposition of a sample of the cellulose ether with hydrogen iodide, followed by determining the alkyl iodides by means of gas chromatography (Zeisel method).

Parts and percentages in the following examples are by weight, unless stated otherwise.

Example 1
Preparation of hydroxyethylcellulose (HEC)

In a 2 l glass reactor, 85.0 g of linters pulp were suspended in 800 g of t-butanol/methanol/water in a weight ratio of 87/1/12. This was inerted three times, and 56 g of 50% strength sodium hydroxide solution were then added. After stirring for 45 min at room temperature, 125 ml of ethylene oxide were added, followed by heating to 40° C. for 1 h and to 80° C. for a further 1.5 h. The mixture was then cooled to less than 30° C.

Separation of the suspension medium phase

After the reaction batch had been cooled it was transferred, without neutralization, to a glass filter nutsche pressurized with nitrogen. The batch was filtered off with suction. The suspension medium phase mainly comprised t-butanol, glycols and a small amount of sodium hydroxide solution. The suspension medium phase was collected in a separate vessel.

Washing of crude HEC

The filter cake was suspended in 1 l of a solvent mixture of t-butanol/methanol/water 65/30/5 and again transferred to the nutsche. The filter cake was further eluted with the same solvent mixture. Initially the conductivity of the eluate was about 1300 $\mu$S and then rose to 3500 $\mu$S. After 2440 g of solvent mixture had passed through, the conductivity of the final eluate was 780 $\mu$S. In total, about 16 kg of solvent were consumed per kg of HEC.

Neutralization

The HEC was slurried once more in the same solvent mixture and neutralized by concentrated hydrochloric acid being added to the suspension. Filtration took place with strong suction, and the filtrate was worked up together with the extraction medium.

Drying

The moist product (1103 g, 16.5% solid, 5.9% water) was dried at 75° C. This produced 170 g of an HEC with a solids content of 93.4% and a percentage of 5.6% of sodium chloride, based on the solid. The viscosity was 60,000 mPa.s. The molar degree of substitution (MS) was 3.1.

Distillation of the eluate

The solvent mixture from the extraction was subjected to simple distillation on a rotary evaporator (200 mbar, 65° C.). The distillate consisted of 60.4% of t-butanol, 34.0% of methanol and 5.6% of water and was therefore, having been fortified with t-butanol, suitable once more for use in the extraction.

Separation of the sodium hydroxide solution

The aqueous distillation residue (70 g) was combined with the suspension phase separated off from the etherification process, heated to 60° C. and transferred to a separator. Two defined phases formed. Between the two phases a further layer formed which was an emulsion of hemicelluloses, glycols, dissolved HEC and sodium hydroxide solution. The bottom phase was separated off. This produced 58 g of 25.6% strength sodium hydroxide solution which still contained 5.1% of glycols, 1% of methanol and 1.3% of t-butanol. The interlayer was distilled together with the upper, organic phase.

The separated sodium hydroxide solution was suitable for reuse, without further work-up. In this example, 53% of the sodium hydroxide solution used were recycled.

Distillation of the suspension medium

The separated upper phase was distilled on a rotary evaporator (200 mbar, 60° C.). The distillate (557 g) consisted of 90.8% of t-butanol, 5.4% of water and 1% of methanol (remainder: t-butyl glycol, methyl glycol) and was therefore, having been made up with t-butanol, reusable as a suspension medium.

Example 2
Use of recovered sodium hydroxide solution

This experiment was carried out as described in Example 1. The sodium hydroxide solution used, however, comprised 112 g of 25% strength sodium hydroxide solution which had been recovered by recycling from previous experiments. The molar degree of substitution (MS) of the product was 3.0, the viscosity of a 2% strength aqueous solution was 55,000 mPa.s.

Example 3
Washing-out by suspension in the extraction medium

This experiment was carried out as described in Example 1. Extraction of the crude product was effected, however, by the crude product being suspended 4 times, each time in 780 g of the solvent mixture, followed by filtration with suction in a nutsch. The conductivity of the final eluate was 580 $\mu$S. The solvent consumption was about 20 kg/kg of HEC.

In this experiment 65% of the sodium hydroxide solution were able to be recovered.

Example 4
Preparation of hydroxyethylcellulose (HEC)

In a glass reactor, 85.0 g of spruce pulp were suspended in 800 g of t-butanol/ethanol/water in a weight ratio of 85/5/10. This was inerted three times, and 56 g of 50% strength sodium hydroxide solution were then added. After stirring for 45 min at room temperature, 110 ml of ethylene oxide were added, followed by heating to 40° C. for 1 h and to 80° C. for a further 1.5 h. The mixture was then cooled to less than 30° C.

Separation of the suspension medium phase

After the reaction batch had cooled, filtration by suction was carried out on a filter nutsche. This produced 700 g of suspension medium phase.

Washing of crude HEC

The filter cake was suspended in 1 l of a solvent mixture of t-butanol/ethanol/water in a weight ratio of 20/75/5 and again transferred to the nutsche. The filter cake was further eluted with the same solvent mixture. Initially the conductivity of the eluate was about 1200 $\mu$S and then rose to 3200 $\mu$S. After 2460 g of washing medium had passed through, the conductivity obtained for the last eluate was 390 $\mu$S. The solvent consumption overall was about 16 kg/kg of HEC.

Neutralization

The HEC was slurried once more in the same solvent mixture and neutralized by acetic acid being added. Filtration took place with strong suction, and the filtrate was worked up together with the extraction medium.

Drying

The moist product was dried at 70° C. This produced 172 g of an HEC with a solids content of 97.8% and a percentage of 8.2% of sodium acetate, based on the solid. The viscosity of a 2% strength aqueous solution was 180 mPa.s. The molar degree of substitution (MS) of the product was 3.1. The product was soluble in water at room temperature to 99.5%.

Distillation of the eluate

The solvent mixture from the extraction was distilled on a rotary evaporator (200 mbar, 65° C.). The distillate consisted of 21.6% of t-butanol, 72.9% of ethanol and 5.6% of water and was therefore, having been fortified with ethanol, suitable once more for use in the extraction.

Separation of the sodium hydroxide solution

The aqueous distillation residue (43 g) was combined with the suspension medium separated off from the etherification process, heated to 60° C. and transferred to a separator. Two phases formed. The bottom phase was separated off. This produced 64 g of 23% strength sodium hydroxide solution which still contained 1.6% of glycols and 0.4% of t-butanol. The interphase was distilled together with the upper, organic phase.

The separated sodium hydroxide solution was suitable for reuse, without further work-up. In this example, 53% of the sodium hydroxide solution used were recycled.

Distillation of the suspension medium

The separated upper phase was distilled on a rotary evaporator (200 mbar, 60° C.). The distillation (620 g) consisted of 87.9% of t-butanol, 6.4% of water and 5.7% of ethanol (remainder: t-butyl glycol, ethyl glycol) and was therefore, having been made up with ethanol, reusable as a suspension medium.

Example 5

Preparation of hydroxyethylcellulose (HEC)

In a glass reactor, 85.0 g of spruce pulp were suspended in 800 g of 85% strength aqueous isopropanol. This was inerted three times, and 56 g of 50% strength sodium hydroxide solution were then added. After stirring for 45 min at room temperature, 153 ml of ethylene oxide were added, followed by heating to 40° C. for 1 h and to 80° C. for a further 1.5 h. The mixture was then cooled to less than 30° C.

Separation of the suspension medium phase

After the reaction batch had cooled, filtration by suction was carried out on a filter nutsche.

Washing of crude HEC

The filter cake was suspended in 1 l of a solvent mixture of isopropanol/methanol/water in a weight ratio of 69/25/6 and again transferred to the nutsche. The filter cake was further eluted with the same solvent mixture. Initially the conductivity of the eluate was about 1480 $\mu$S and then rose to 3300 $\mu$S. After 3280 g of washing medium had passed through, the conductivity obtained for the last eluate was 540 $\mu$S.

Neutralization

The HEC was slurried once more in the same solvent mixture and neutralized by 11.6 g of acetic acid being added. Filtration took place with strong suction, and the filtrate was worked up together with the extraction medium.

Drying

The moist product was dried at 70° C. This produced 154 g of a hydroxyethylcellulose with a solids content of 97.8% and a percentage of 10.2% of sodium acetate, based on the solid. The viscosity of a 2% strength aqueous solution was 73,000 mPa.s. The molar degree of substitution (MS) was 2.8. The product was soluble in water at room temperature to 97%.

Distillation of the eluate 3688 g of the solvent mixture from the extraction was distilled on a rotary evaporator (250 mbar, 65° C.). The distillate (3570 g) consisted of 70.2% of isopropanol, 22.6% of methanol and 7.3% of water and was suitable once more for use in the extraction.

Separation of the sodium hydroxide solution

The aqueous distillation residue (113 g) was combined with the suspension medium separated off from the etherification process, heated to 60° C. and transferred to a separator. Two phases formed. The bottom phase was separated off. This produced 67 g of 22% strength sodium hydroxide solution which still contained 1.3% of glycols and 2.5% of isopropanol.

The separated sodium hydroxide solution, having been made up with pure sodium hydroxide, was suitable for reuse, without further work-up. In this example, 57% of the sodium hydroxide solution used were recycled.

Distillation of the suspension medium

The separated upper phase was distilled on a rotary evaporator (200 mbar, 60° C.). The distillate (794 g), having a composition of 85.8% of isopropanol, 13.4% of water and 0.8% of methanol, almost matched the mixture used and was therefore reusable as a suspension medium.

What is claimed is:

1. A process for the preparation of hydroxyalkyl cellulose ethers, comprising:

(a) etherifying cellulose with an alkylene oxide in a water-containing organic suspension medium in the presence of an effective quantity of inorganic alkali which is approximately at least one equivalent of inorganic alkali per mole of anhydroglucose units in the cellulose, to obtain a crude hydroxyalkylcellulose ether;

(b) separating the water-containing organic suspension medium from the crude hydroxyalkyl cellulose ether, said crude hydroxylalkyl cellulose ether containing a major amount of said effective quantity of inorganic alkali, the thus-separated water-containing organic suspension medium containing a minor amount of said effective quantity of inorganic alkali;

(c) extracting essentially said major amount from said crude hydroxyalkyl cellulose ether, with a liquid organic extracting medium capable of extracting inorganic alkali, to obtain an eluate containing essentially said major amount and separating out, from said eluate, hydroxyalkylcellulose contaminated with essentially only a residual amount of inorganic alkali;

(d) treating with acid said hydroxyalkylcellulose contaminated with only a residual amount of inorganic alkali to neutralize essentially only said residual amount of inorganic alkali;

(e) separating essentially all of said inorganic alkali in said eluate from said eluate;

(f) recovering the thus-separated inorganic alkali in sufficient purity for use in the etherification of cellulose with an alkylene oxide or for use in partial hydrolysis of cellulose.

2. The process of claim 1, wherein said inorganic alkali is sodium hydroxide, and said cellulose-digesting amount is at least 1.0 mole of sodium hydroxide per mole of anhydroglucose units in the cellulose which is etherified;

said extracting medium comprises an ORGANIC solvent mixture optionally containing water; and, after said extracting, said eluate is distilled to recover essentially purified organic solvent mixture and a distillation residue comprising sodium hydroxide;

said water-containing organic suspension medium is combined with said distillation residue to form a mixture having a plurality of phases including a lower phase; and sodium hydroxide is separated from said lower phase and utilized in the preparation of a cellulose ether from cellulose.

3. The process of claim 2, wherein the thus-separated sodium hydroxide is recycled to said step (a) of the process.

4. The process of claim 2, wherein the thus-recovered, essentially purified organic solvent mixture is recycled for use in said step (c).

5. The process of claim 1, wherein said water-containing organic suspension medium contains a monohydric alcohol having from 2 to 4 carbon atoms.

6. The process of claim 1, wherein said liquid organic extracting medium contains at least one organic component which is the same as a component of said water-containing organic suspension medium.

7. The process of claim 1, wherein said liquid organic extracting medium comprises from about 20 to about 80 parts by weight of the same organic components as said water-containing organic suspension medium, from about 20 to about 80 parts by weight of methanol, and from 0 to about 10 parts by weight of water.

8. The process of claim 1, wherein, in said step (a), the weight ratio of water-containing organic suspension medium to cellulose is from about 3:1 to about 20:1.

9. The process of claim 1, wherein the inorganic alkali recovered in said step (f) is employed in the preparation of cellulose ethers which contain hydroxyalkyl groups.

10. The process of claim 2, wherein the essentially purified organic solvent mixture distilled from said eluate is employed as a solvent mixture for extracting the crude cellulose ether.

11. The process of claim 1, wherein the weight ratio of the water-containing organic suspension medium to cellulose is from about 3:1 to about 20:1.

12. The process of claim 1, wherein the water-containing organic suspension medium contains a monohydric alcohol having from 2 to 4 carbon atoms.

13. The process of claim 1, wherein said hydroxyalkyl groups are hydroxyethyl, hydroxypropyl, or a combination thereof, and wherein said liquid extracting medium contains water.

14. The process of claim 1, wherein at least 50% by weight or in mole %, of said effective quantity of inorganic alkali is recovered and reused in said process.

15. A process for preparing water-soluble cellulose ethers which contain hydroxyalkyl groups comprising:

a) etherifying cellulose with alkylene oxide in a water-containing organic suspension medium in the presence of at least 1.0 mol of sodium hydroxide per mole of anhydroglucose units;

b) separating off the crude cellulose ether;

c) extracting the crude cellulose ether with a suitable solvent mixture;

d) distilling the lower-boiling organic components from the solvent mixture after the extraction;

e) adding the distillation residue to the water-containing organic suspension separated off in step (b) to form a multiphase mixture;

f) separating out the lower layer of said multiphase mixture; and g) reusing the sodium hydroxide in said lower layer in step (a) or in partial hydrolysis of cellulose.

* * * * *